US007736233B2

United States Patent
Pachnis et al.

(10) Patent No.: US 7,736,233 B2
(45) Date of Patent: Jun. 15, 2010

(54) SYSTEM AND METHOD FOR ENTERTAINMENT GAME

(75) Inventors: Spyridon Pachnis, Athens (GR); Eleni Lialiamou, Piraeus (GR); Marios Anapliotis, Piraeus (GR)

(73) Assignee: Intralot S.A., Athens (GR)

( * ) Notice: Subject to any disclaimer, the term of this patent is extended or adjusted under 35 U.S.C. 154(b) by 1086 days.

(21) Appl. No.: 11/404,402

(22) Filed: Apr. 13, 2006

(65) Prior Publication Data

US 2006/0253528 A1 Nov. 9, 2006
US 2007/0239823 A9 Oct. 11, 2007

(51) Int. Cl.
*G06F 17/00* (2006.01)
(52) U.S. Cl. .......................................... 463/42
(58) Field of Classification Search ................... 463/17, 463/25, 40–42; 709/220
See application file for complete search history.

(56) References Cited

U.S. PATENT DOCUMENTS

| 6,443,840 | B2 * | 9/2002 | Von Kohorn .................. 463/17 |
| 6,687,734 | B1 * | 2/2004 | Sellink et al. ................ 709/203 |
| 7,003,264 | B2 * | 2/2006 | Fodor et al. ............... 455/67.11 |
| D540,398 | S | 4/2007 | Gadda et al. |
| D540,399 | S | 4/2007 | Gadda et al. |
| 7,198,569 | B2 | 4/2007 | Wolf et al. |
| 7,198,570 | B2 | 4/2007 | Rodgers et al. |
| 7,198,571 | B2 | 4/2007 | LeMay et al. |
| 7,201,657 | B2 | 4/2007 | Baerlocher et al. |
| 7,201,660 | B2 | 4/2007 | Kiely et al. |
| 7,201,662 | B2 | 4/2007 | LeMay et al. |
| 7,203,841 | B2 | 4/2007 | Jackson et al. |
| 7,204,754 | B2 | 4/2007 | Gray et al. |
| 7,204,756 | B2 | 4/2007 | Jubinville et al. |
| RE39,644 | E | 5/2007 | Alcorn et al. |
| 7,210,997 | B2 | 5/2007 | Hughs-Bair |
| 7,213,811 | B2 | 5/2007 | Bozeman |
| 7,217,189 | B2 | 5/2007 | Kaminkow |
| 7,220,180 | B2 | 5/2007 | Kaminkow |
| 7,222,857 | B2 | 5/2007 | Moody |
| 7,222,858 | B2 | 5/2007 | Moody |
| 7,223,172 | B2 | 5/2007 | Baerlocher et al. |
| 7,226,358 | B2 | 6/2007 | Miller et al. |

(Continued)

FOREIGN PATENT DOCUMENTS

EP 1 415 691 6/2004

(Continued)

*Primary Examiner*—Ronald Laneau
(74) *Attorney, Agent, or Firm*—White & Case LLP

(57) ABSTRACT

A communication system for use in entertainment games comprises a server accessible by a plurality of game users via a mobile communications network. The server is configured to request the availability of first data, preferably correlated to money, from game users and facilitates real-time communication between users. The server allows a user to correlate its first data to the result of a comparison made during game play and is configured to automatically compare second data entered by users to determine the result. Preferably, the second data is dependent on and/or affected by the physical and/or intellectual skill of the user. The result may also be affected by random parameters, communicated to the users as instant tickets prior to the start of game play. Based on the result, the server automatically distributes the first data to users according to the result and the correlation of the first data to the result.

48 Claims, 2 Drawing Sheets

U.S. PATENT DOCUMENTS

| | | | |
|---|---|---|---|
| 7,226,359 B2 | 6/2007 | Bussick |
| 7,229,350 B2 | 6/2007 | Baerlocher et al. |
| 7,229,351 B2 | 6/2007 | Haag et al. |
| 7,235,009 B2 | 6/2007 | Baerlocher |
| 7,235,010 B2 | 6/2007 | Baerlocher |
| 7,235,011 B2 | 6/2007 | Randall et al. |
| 7,238,109 B2 | 7/2007 | McGahn et al. |
| 7,238,110 B2 | 7/2007 | Glavich et al. |
| 7,240,036 B1 | 7/2007 | Mamdani et al. |
| 7,241,220 B2 | 7/2007 | Rothkranz et al. |
| D548,288 S | 8/2007 | Baerlocher et al. |
| D548,800 S | 8/2007 | Kaminkow et al. |
| 7,252,590 B2 | 8/2007 | Palmer et al. |
| 7,252,591 B2 | 8/2007 | Van Asdale |
| 7,252,592 B2 | 8/2007 | Rodgers et al. |
| 7,258,609 B2 | 8/2007 | Nordman et al. |
| 7,258,611 B2 | 8/2007 | Bigelow, Jr. et al. |
| 7,258,613 B2 | 8/2007 | Lucchesi et al. |
| 7,264,545 B2 | 9/2007 | Maya et al. |
| 7,267,612 B2 | 9/2007 | Alcorn et al. |
| 7,270,604 B2 | 9/2007 | Gerrard et al. |
| 7,273,415 B2 | 9/2007 | Cregan et al. |
| 7,278,638 B2 | 10/2007 | Nordman |
| 7,278,916 B2 | 10/2007 | Boyd et al. |
| 7,278,917 B2 | 10/2007 | McGlone et al. |
| 7,278,919 B2 | 10/2007 | Souza et al. |
| 7,281,977 B2 | 10/2007 | Jones |
| 7,624,125 B2 * | 11/2009 | Feinsmith ............... 707/104.1 |
| 2002/0094869 A1 * | 7/2002 | Harkham .................. 463/42 |
| 2006/0234631 A1 * | 10/2006 | Dieguez .................. 455/41.2 |
| 2007/0077981 A1 | 4/2007 | Hungate et al. |
| 2007/0077990 A1 | 4/2007 | Cuddy et al. |
| 2007/0082725 A1 | 4/2007 | Low et al. |
| 2007/0087809 A1 | 4/2007 | Baerlocher |
| 2007/0087811 A1 | 4/2007 | Mayeroff |
| 2007/0087812 A1 | 4/2007 | Glavich et al. |
| 2007/0087834 A1 | 4/2007 | Moser et al. |
| 2007/0087841 A1 | 4/2007 | Beaulieu et al. |
| 2007/0093290 A1 | 4/2007 | Winans et al. |
| 2007/0094721 A1 | 4/2007 | Nguyen et al. |
| 2007/0099688 A1 | 5/2007 | Brosnan et al. |
| 2007/0099696 A1 | 5/2007 | Nguyen et al. |
| 2007/0099697 A1 | 5/2007 | Nelson |
| 2007/0105613 A1 | 5/2007 | Adams et al. |
| 2007/0105619 A1 | 5/2007 | Kniesteadt et al. |
| 2007/0105620 A1 | 5/2007 | Cuddy et al. |
| 2007/0111776 A1 | 5/2007 | Griswold et al. |
| 2007/0111780 A1 | 5/2007 | Parrott et al. |
| 2007/0111782 A1 | 5/2007 | Adams et al. |
| 2007/0111783 A1 | 5/2007 | Cuddy et al. |
| 2007/0111787 A1 | 5/2007 | Adams et al. |
| 2007/0117606 A1 | 5/2007 | Baerlocher et al. |
| 2007/0117608 A1 | 5/2007 | Roper et al. |
| 2007/0117610 A1 | 5/2007 | Webb et al. |
| 2007/0117616 A1 | 5/2007 | Bartholomew |
| 2007/0117623 A1 | 5/2007 | Nelson et al. |
| 2007/0120320 A1 | 5/2007 | Miltenberger et al. |
| 2007/0123341 A1 | 5/2007 | Tessmer et al. |
| 2007/0129128 A1 | 6/2007 | McClintic et al. |
| 2007/0129131 A1 | 6/2007 | Kaminkow et al. |
| 2007/0129133 A1 | 6/2007 | Bansemer et al. |
| 2007/0129139 A1 | 6/2007 | Nguyen et al. |
| 2007/0134042 A1 | 6/2007 | Meyerhofer |
| 2007/0135193 A1 | 6/2007 | Nicely |
| 2007/0135194 A1 | 6/2007 | Nicely et al. |
| 2007/0135203 A1 | 6/2007 | Nicely |
| 2007/0135204 A1 | 6/2007 | Nicely |
| 2007/0135216 A1 | 6/2007 | Martinek et al. |
| 2007/0136817 A1 | 6/2007 | Nguyen |
| 2007/0149269 A1 | 6/2007 | Benbrahim |
| 2007/0149270 A1 | 6/2007 | Baerlocher et al. |
| 2007/0149280 A1 | 6/2007 | LeMay et al. |
| 2007/0149281 A1 | 6/2007 | Gadda et al. |
| 2007/0149292 A1 | 6/2007 | Kaminkow et al. |
| 2007/0161423 A1 | 7/2007 | Bienvenue et al. |
| 2007/0178970 A1 | 8/2007 | LeMay et al. |
| 2007/0184887 A1 | 8/2007 | Cannon |
| 2007/0184894 A1 | 8/2007 | Baerlocher |
| 2007/0184895 A1 | 8/2007 | Adams |
| 2007/0191088 A1 | 8/2007 | Breckner et al. |
| 2007/0197298 A1 | 8/2007 | Rowe |
| 2007/0202941 A1 | 8/2007 | Miltenberger et al. |
| 2007/0207852 A1 | 9/2007 | Nelson et al. |
| 2007/0207854 A1 | 9/2007 | Wolf et al. |
| 2007/0213119 A1 | 9/2007 | Baerlocher et al. |
| 2007/0218975 A1 | 9/2007 | Iddings et al. |
| 2007/0225063 A1 | 9/2007 | Bussick et al. |
| 2007/0232377 A1 | 10/2007 | Haag et al. |
| 2007/0243925 A1 | 10/2007 | LeMay et al. |
| 2007/0243928 A1 | 10/2007 | Iddings |
| 2007/0243934 A1 | 10/2007 | Little et al. |
| 2009/0144144 A1 * | 6/2009 | Grouf et al. .................. 705/14 |

FOREIGN PATENT DOCUMENTS

| | | |
|---|---|---|
| FR | 2 814 085 | 9/2000 |
| WO | WO 2004/075091 | 9/2004 |
| WO | WO 2005027060 | 3/2005 |
| WO | WO 2006/109101 | 10/2006 |
| WO | WO 2007/035618 | 3/2007 |
| WO | WO 2007/043679 | 4/2007 |
| WO | WO 2007/073534 | 6/2007 |
| WO | WO 2007/073535 | 6/2007 |
| WO | WO 2007/075582 | 7/2007 |
| WO | WO 2007/076238 | 7/2007 |
| WO | WO 2007/075486 | 9/2007 |
| WO | WO 2007/078828 | 9/2007 |
| WO | WO 2007/092234 | 9/2007 |
| WO | WO 2007/100744 | 9/2007 |
| WO | WO 2007/103069 | 9/2007 |
| WO | WO 2007/103170 | 9/2007 |
| WO | WO 2007/106659 | 9/2007 |
| WO | WO 2007/075380 | 10/2007 |
| WO | WO 2007/075401 | 10/2007 |
| WO | WO 2007/117953 | 10/2007 |

* cited by examiner

SYSTEM AND METHOD FOR ENTERTAINMENT GAME

FIELD OF THE INVENTION

The present invention relates to a communication server and to a computer communication method, and in particular, to performing and administrating a comparison of data in an entertainment game.

BACKGROUND OF THE INVENTION

Communication between people has been a main social event ever since the invention of the telephone eliminated spatial limits of communication—tremendously enhanced by the subsequent introduction of the Internet. Whereas communication via telephone generally continues to be delimited to a person-to-person contact, technical means for the internet and related networks created platforms for open communication between groups of people and even between an almost unlimited number of participants. And in contrast to the traditional technique of broadcasting (radio, television and the like), communication through the modern networks works bi-directionally. One known general tool for technically offering such multi-partner multi-directional communication is commonly known as a "chat room".

To return to a more general, historical level, one main purpose of communication was and still is of a draw comparison, in the broad range of meaning of that word. In ancient times, men may have stepped towards each other saying "my axe is stronger than yours, beware" whereas in modern times, they may say "my car is faster than yours" by way of example in a particular technical context, "energy storage means A is more efficient than energy storage means B and is thus more appropriate for the energy supply of your machine being under construction".

Nowadays, information is available to an extent that is impossible to be overlooked. This statement may now be a platitude and a commonplace—but it has a very interesting broader sense of meaning in the present context: Whereas in former times of communication information was available from person to person only, information today is available automatically—as being stored in whatever kind of data storage means. Availability and accessibility vary extremely according to respective purposes. But having the according permission, the initial statement does not mean anything else but: communication in modern networks is not only possible multi-directionally, but also involving human beings as well as machines.

BRIEF DESCRIPTION OF THE INVENTION

Against this background, the server and method according to the present invention provide for the automatic performance and administration of a comparison of data of any sort, of the result of the comparison and of data correlated to the result by way of a computer communication server comprising the features of claim 1 or by way of a computer communication method comprising the features of claim 2. Preferred embodiments of the invention are disclosed in the dependent claims.

It is one aspect of the present invention that a communication server for automatically performing and administrating a comparison, its result and data correlated to the result is connectable to a network. The server of the invention is accessible via the network by at least two users.

The server of the invention comprises a platform program accessible by the users allowing communication between the users. Preferably, the users enter the platform via the network through their mobile phones—wherein preferably only one application is required on the respective mobile phones for easy and immediate availability at any place. The communication may be performed either in real time—or stepwise, e.g. addressing communication to mailboxes of communication partners or even to storage areas of broader accessibility, somehow like "pin boards" in traditional communication.

The platform program of the invention further is programmed to request availability of certain data ("first data") from the users, wherein the first data is correlatable to a result of a comparison of second data. In other words, if for example the above-mentioned comparison between the efficiency parameters (second data) of technical devices like the mentioned energy storages is to be performed, availability of data regarding their further technical specification (first data: spatial dimensions, weight, . . . ) is requested.

The server of the invention further comprises a correlation program allowing the users to correlate the first data to the result of a comparison. If in the mentioned example at least one of the users is an engineer in a research and development team, who would like to communicate the efficiency of an energy storage, which he has just developed, via the team intranet, the correlation program allows him to correlate the mentioned first data (the technical specification of the storage) to the result of a comparison of the second data. This is for example first data that he wishes to forward to his colleagues in case that a comparison with another energy storage (developed e.g. by another colleague) results in that his own development is more efficient.

The server of the invention further comprises a comparison program, which is programmed to automatically compare second data entered by the users—e.g. the efficiency parameters of energy storage A and B developed by two different members of the research and development team.

The server of the invention further comprises an evaluation program that automatically distributes the first data, which had been correlated to the result of the comparison of the second data—according to the result of the second data's comparison and according to the correlation. In our example, the evaluation program automatically directs and sends the technical specification data (first data of the more efficient data storage) to the two developers (and preferably to the other team members as well) if the respective developer had correlated the first data accordingly.

It is a second aspect of the invention that a computer communication method for automatically administrating a comparison, its result and data correlated to the result comprises the step wherein at least two users respectively enter second data into a program, which then is automatically compared by means of a program. The method further comprises the step that the users respectively correlate first data to the result of the comparison via a network and that the first data is distributed to the users automatically by means of a program according to the result of the comparison and according to the correlation.

Preferably the involved network comprises a mobile phone network as at least part of the network. Examples of wireless (mobile) communication networks include, without being limited to these, GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or TD/CDMA in UMTS (Time Division/Code Division Multiple Access in Universal Mobile Telecommunications System), IMT 2000 and so on. The network also may comprise or consist of the already mentioned Internet and/or a Local Area Net. As mentioned above, it is well preferred to use a mobile phone network at the users end of the network to enter the platform program via the mobile phone.

It is one further optional aspect of the invention that the users may enter the second data at the same time. In other words, the comparison is performed in real time in such cases, where this is appropriate. For example, if the users are playing a video game—wherein the second data is e.g. steering signals from a joystick—the users enter these second data simultaneously in order to perform a competition, which is automatically evaluated according to the invention. From this example, it may be understood that the comparison of the second data according to the invention may be performed indirectly as well—by comparing an intermediate result produced for example by the video game program affected by the steering signals. It is further understandable from this example that the entering of the second data can be dependent on and/or affected by the physical and/or intellectual skill of the user. In the context of entertainment games, the result of the comparison may as well be affected by random parameters, which may be communicated by a program to the users as "instant tickets" in advance prior to starting their game. This is also a new concept of entertainment computer games in general. The player receives an instant ticket that defines e.g. power, speed and tires of his car at a formula 1 racing game. Those parameters—e.g. being worse than those, which his competitor has received with his instant ticket—affect the result of the race as well as the skill of the two players does.

Somehow as a new way of communication, the invention technically enables the users reliably to get in contact with each other for what ever kind of comparison of facts, objects, information, experience, knowledge or—only by way of example for another possible content of this communication—to play games with each other, either in real time or even if there is a time gap between their respective entering of the second data. According to the invention, this all can be on multi-user platforms and/or in an around-the-world-distance relationship and provides for reliable automatic exchange of (the first) data as correlated prior to start of the comparison.

BRIEF DESCRIPTION OF THE DRAWINGS

These already mentioned features as well as additional features of the invention are described in the following by way of example and without any limitation to the description of the preferred embodiments as depicted in the attached figures.

DETAILED DESCRIPTION OF THE PREFERRED EMBODIMENTS

Figure 1:
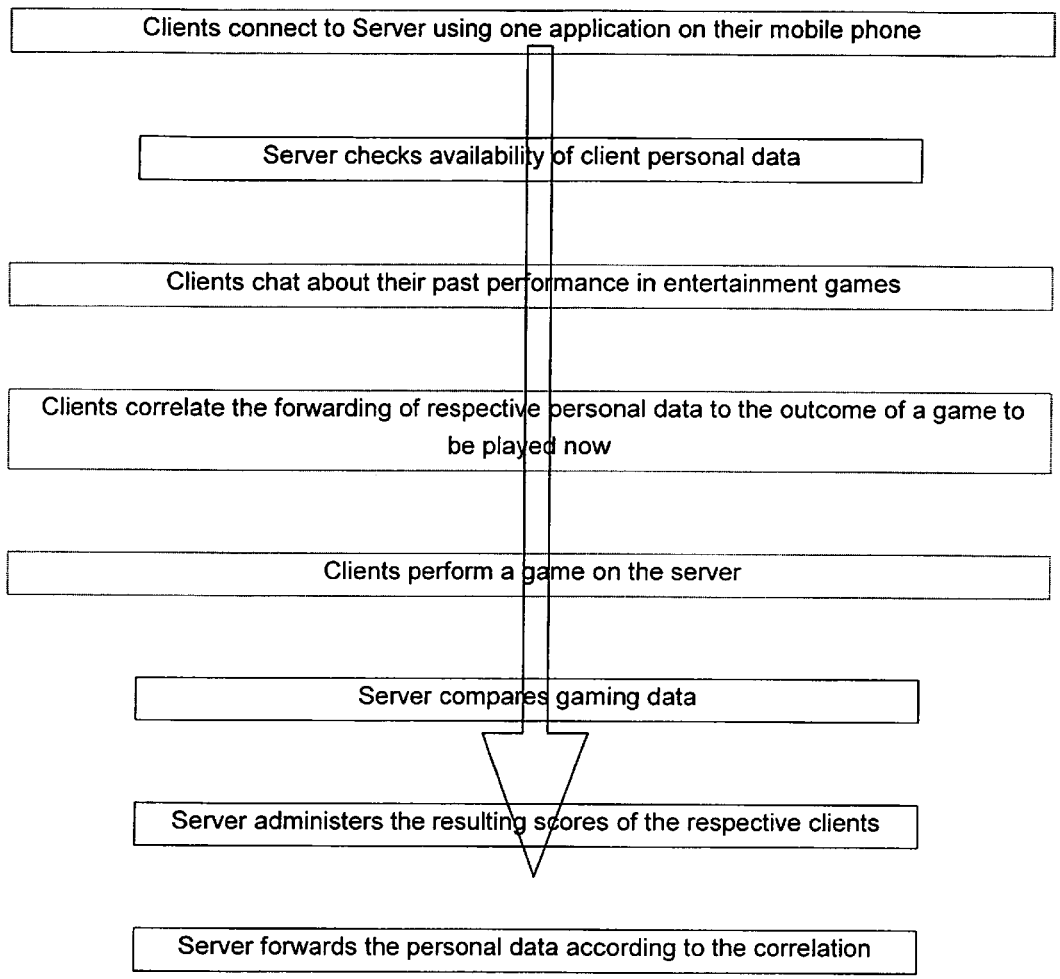
FIG. 1 shows a flow chart comprising the general steps of a computer communication method according to the invention involving mobile phones as user access front ends.

The specifically described preferred embodiment of the invention—and particularly the server therein—is capable of receiving events in real time from network clients connected to a "session", e.g. according to FIG. 1. In other words, all information that is required at one point in time about the "event" is comprised in one message—for example using protocol stacks according to FIG. 2. The events are sent in real-time directly to the server. The events relate to one session, for example (like in the example further above) to a networked energy storage design team or to an entertainment game community being online via mobile phone and/or PC. The events are generated by a number of different connected network clients, e.g. the designer colleagues or the members of the game community.

At this mobile phone communication system, there is no need for the user to use additional applications, establish additional network connections or have any prior knowledge of the other users of the system. Also, no end user personal data (such as MSISDN, email) needs to be disclosed so as to achieve instant messaging and offline messaging, but end users are identified by a unique "nickname".

Without the invention, mobile phone users would need a series of different mechanisms and tools to locate the party they would like to communicate, e.g. use of WAP browser so as to find other end users based on certain relevant search criteria. Communication would also require applications like Mobile Instant Messaging for enabling message exchanges between selected end users. But amongst other advantages, the invention eliminates the need of accessing and distributing end user personal data such as MSISDN or email for locating and addressing users via standard voice, electronic mail or mobile SMS so as to enable communication between end users and agree upon the first data. End users would otherwise also need to have a synchronized set of parameters for exchanging required information, i.e. exact time/date to start playing an actual game, initiate multi-user communication session, provide required authentication information and enter second data e.g.. Furthermore, users would require a mechanism to allow them to locate additional end users for setting up new first data, and repeating the previously described process.

An application "session" according to the invention is an instance of an application that is started at a given point in time. Clients join and leave the virtual world, and the application session is eventually terminated under some predefined conditions. During the session, the server (Multi-User Node) receives information (data) from the client units directly, containing all required information within the protocol stacks of one message (multi-user protocol message). The server unit stores state information received from each of the client units. The server also transmits at least a part of the stored information to the connected clients. This way, the whole state of an application can be kept even in one unit of the network. This avoids that each client needs to store the entire state, and reduces memory and bandwidth requirement for each client.

Security and fraud prevention features are very much preferred to be implemented in the communication system as well.

Figure 2:
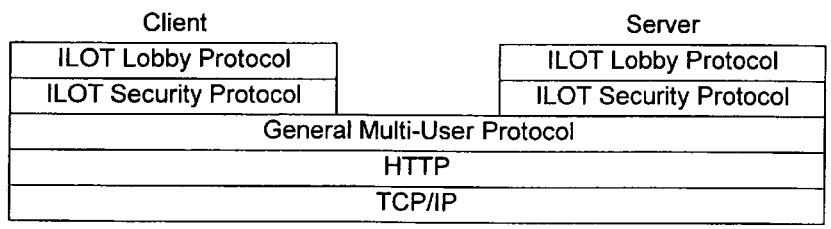
FIG. 2 shows architectural details of the protocol messages sent between the mobile phones and the server according to FIG. 1.

According to FIG. 2, one embodiment of the invention for communication and gaming via mobile phone comprises client applications and a server implementing a protocol stack comprising the following protocol layers:

ILOT Lobby Protocol/ILOT Game Protocol
ILOT Security Protocol
Multi-User protocol
TCP protocol
IP protocol A protocol stack is a layered set of protocols, which work together to provide a set of network functions. Each intermediate protocol layer uses the layer below it to provide a service to the layer above.

A protocol layer is the software and/or hardware environment of two or more communication devices or computers in which a particular network protocol operates. A network connection may be thought of as a set of more or less independent protocols, each in a different layer or level. The lowest layer governs direct host-to-host communication between the hardware at different hosts; the highest consists of user application programs. Each layer uses the layer beneath it and provides a service for the layer above. Each networking component hardware or software on one host uses protocols appropriate to its layer to communicate with the corresponding component (its "peer") on another host. Such layered protocols are sometimes known as peer-to-peer protocols.

The advantages of layered protocols is that the methods of passing information from one layer to another are specified clearly as part of the protocol suite, and changes within a protocol layer are prevented from affecting the other layers. This greatly simplifies the task of designing and maintaining communication systems.

Examples of layered protocols are TCP/IP's five layer protocol stack and the OSI seven layer model.

The objective of this embodiment is to allow users with mobile devices to run client applications having a "small footprint" (namely, the: amount of disk space required by an application), with single network connection and, through a single protocol stack with reduced memory and bandwidth requirements to perform operations for the following functions: chatting between clients e.g. about entertainment games and their past performance therein, instant messaging or offline messaging to invite opponent, matchmaking (to agree on first data), even for example negotiating a bet amount and registering a peer-to-peer bet (to correlate first data to the result of the comparison of second data, wherein first data may even be correlated to money), playing the actual multi-player game (to enter second data in real time), evaluating the result including automatic fraud-protected distribution of the first data (to evaluate and administrate the result of the comparison of second data)—as well as requesting and thus assuring the availability of the first data and the integrity of the whole procedure.

The client application has small footprint explained above so as to run on low-end mobile devices. The client application needs to establish only one data network connection and a minimum amount of data is sent/received over the single data network connection.

Figure 3:
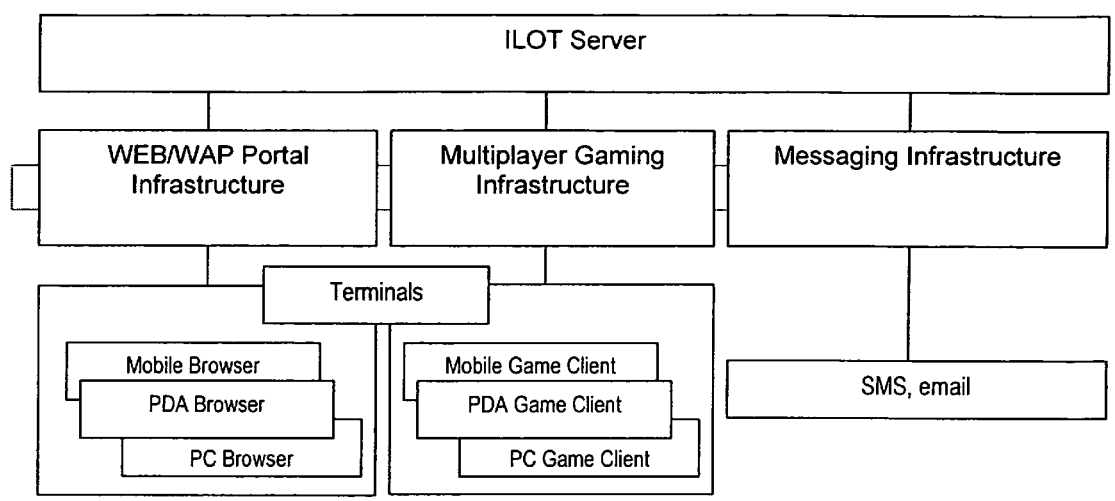
FIG. 3 schematically shows an overall system architecture according to the invention.

FIG. 3 schematically shows an overall system architecture according to the invention with mandatory components including Intralot™ ("ILOT") Server, a multiplayer gaming infrastructure, and ILOT Protocols as well as optional system components such as WEB/WAP Portal Infrastructure allowing users to browse through their PC/mobile WEB and mobile WAP browsers, as well as messaging infrastructure allowing for sending SMS and email notifications.

As can be seen in FIG. 3, terminals like Mobile, PDA, PCs are the necessary equipment for the end user so as to be able to gain access to the ILOT Server. The game client is a piece of software implementing the necessary game logic and the ILOT Protocol and running on the terminal device. In addition, the terminal equipment allows for establishing data network connection through a fixed or mobile network.

Terminals can be e.g. any of the following type:
Mobile devices supporting one or more of the following technologies (WAP, xHTLM, J2ME, GPRS)
Window compatible PC
PlayStation2 and Microsoft XBOX console with internet connectivity
iTV setup box According to FIG. 3, WAP Portal Infrastructure on the ILOT server is responsible for adapting the layout and content to be presented according to the user device capabilities e.g. screen size, supported colors.

According to FIG. 3, WEB Portal Infrastructure on the ILOT server is responsible for hosting WEB/WAP pages and allowing users to view those.

According to FIG. 3, Multiplayer Gaming Infrastructure on the ILOT server is responsible for communicating with the game clients and co-coordinating the data exchange between multiple players participating in the session.

According to FIG. 3, Messaging Infrastructure on the ILOT server manages alerts and notifications subscriptions, i.e. allowing to create alerts/notifications for events generated inside the system, allowing users to select which alerts/notification they would like to receive, checking whenever relevant events are generated to which users they should be send and how.

According to FIG. 3, the ILOT Server is the "brain" of the system. It contains all the user data, game configuration data, gamer communities, services, as well as orchestrates all the processes to deliver the end user service. The ILOT Server implements the ILOT protocol and communicates to connected clients through the Mobile Gaming Infrastructure.

The following table explains the relations regarding FIG. 3:

| Components | Purpose | Technology |
|---|---|---|
| WEB/WAP Portal Infrastructure — ILOT Server | Login and Registration procedures, Download Digital Content, HTTP Access to ILOT Server | JAVA based APIs |
| Game Client — Multiplayer Gaming Infrastructure | Join/Leave Session Send/Receive Data | Multiuser Protocol |
| Game Client — ILOT Server Multiplayer Gaming Infrastructure | Mobile Lobby Functionality (matchmaking, instant messaging, first data negotiation) Login, Join/Create Session, View Active Sessions | ILOT Protocol Multiplayer Gaming Interface |
| ILOT Server Messaging Infrastructure — ILOT Server Terminal | Send Alerts/Notifications to User(s) using SMS, email Allows to browse WEB/ WAP pages using terminal's WEB/WAP browser on terminal | JAVA based APIs HTTP/WAP protocol |
| WEB/WAP Portal Infrastructure SMS, Email — Messaging Infrastructure | Allows Messaging Infrastructure to massively send SMS/email to clients using different proprietary messaging protocols. | Different messaging protocols |

The invention claimed is:

1. A communication system for use in entertainment games comprising:
   a server accessible via a communications network by a plurality of users;
   a platform program accessible by the plurality of users and configured to request availability of first data from at least one first user of the plurality of users and programmed to allow communication among the plurality of users in real-time;

a correlation program accessible by the plurality of users and configured to allow the at least one first user of the plurality of users to correlate the first data to a result of a comparison;

a comparison program configured to automatically compare second data entered by the at least one first user of the plurality of users to second data entered by at least one second user of the plurality of users and to determine the result of the comparison; and an evaluation program configured to automatically distribute the first data to the plurality of users according to the result of the comparison and according to the correlation of the first data to the result of the comparison, wherein the comparison of the second data entered by the at least one first user of the plurality of users to the second data entered by the at least one second user of the plurality of users is performed by comparing the outcome of an entertainment game, the outcome being a product of the second data entered by the at least one first user of the plurality of users and the second data entered by the at least one second user of the plurality of users.

2. The communication system of claim 1 wherein the communications network comprises a mobile communications network.

3. The communication system of claim 1 wherein the communications network comprises the internet.

4. The communication system of claim 1 wherein the communications network comprises a local area network.

5. The communication system of claim 1 wherein the at least one first user of the plurality of users accesses the communications network via a mobile device.

6. The communication system of claim 1 wherein the second data entered by the at least one first user of the plurality of users comprises personal information corresponding to the at least one first user of the plurality of users and the second data entered by the at least one second user of the plurality of users comprises personal information corresponding to the at least one second user of the plurality of users.

7. The communication system of claim 1 wherein the second data entered by the at least one first user of the plurality of users and the second data entered by the at least one first user of the plurality of users comprises information corresponding to an object of the comparison.

8. The communication system of claim 1 wherein the first data comprises personal information corresponding to the at least one first user of the plurality of users.

9. The communication system of claim 1 wherein the first data comprises a correlation to money.

10. The communication system of claim 1 wherein the comparison of the second data entered by the at least one first user of the plurality of users to the second data entered by the at least one second user of the plurality of users is performed with a computer by directly comparing an intermediate result.

11. The communication system of claim 1 wherein the comparison of the second data entered by the at least one first user of the plurality of users to the second data entered by the at least one second user of the plurality of users is performed with a computer by indirectly comparing an intermediate result.

12. The communication system of claim 11 wherein the second data entered by the at least one first user of the plurality of users comprises at least one steering signal entered by the at least one first user of the plurality of users via at least one first input device and the second data entered by the at least one second user of the plurality of users comprises at least one steering signal entered by the at least one second user of the plurality of users via at least one second input device.

13. The communication system of claim 12 wherein the at least one first input device comprises a joystick.

14. The communication system of claim 12 wherein the at least one second input device comprises a joystick.

15. The communication system of claim 1 wherein the at least one first user of the plurality of users and the at least one second user of the plurality of users enter their respective second data simultaneously in order to perform a competition.

16. The communication system of claim 1 wherein the first data is stored in a pre-loaded storage card represented by a personal code.

17. The communication system of claim 16 wherein the personal code is a telephone number.

18. The communication system of claim 1 wherein the first data is stored in an online data bank represented by a personal code.

19. The communication system of claim 18 wherein the personal code is a telephone number.

20. The communication system of claim 1 wherein the first data is stored in an online credit account represented by a personal code.

21. The communication system of claim 20 wherein the personal code is a telephone number.

22. The communication system of claim 21 wherein the second data entered by the at least one first user of the plurality of users corresponds to the skill of the at least one first user of the plurality of users and the second data entered by the at least one second user of the plurality of users corresponds to the skill of the at least one second user of the plurality of users.

23. The communication system of claim 22 wherein the outcome of the entertainment game is further the product of random parameters communicated to the at least one first user of the plurality of users and the at least one second user of the plurality of users prior to the start of the entertainment game.

24. The communication system of claim 23 wherein the random parameters are communicated to the at least one first user of the plurality of users via at least one first instant ticket and the random parameters are communicated to the at least one second user of the plurality of users via at least one second instant ticket.

25. A computer communication method for use in entertainment games comprising the steps of:

at a server via a communications network, from at least one first user of a plurality of users, at least one communication signal in real-time and first data, the first data correlated to a result of a comparison by the at least one first user of the plurality of users, receiving, at the server via the communications network, second data from the at least one first user of the plurality of users and second data from at least one second user of the plurality of users, automatically comparing the second data from the at least one first user of the plurality of users to the second data from the at least one second user of the plurality of users and determining the result of the comparison with a first computer program running on the server, and automatically distributing the first data to the plurality of users according to the result of the comparison and according to the correlation of the first data to the result of the comparison, the distribution performed with a second computer program running on the server, wherein the comparison of the second data entered by the at least one first user of the plurality of users to the second data entered by the at least one second user of the plurality of users is performed by comparing the outcome of an entertainment game, the outcome being a product of the second data entered by the at least one first user of the plurality of users and the second data entered by the at least one second user of the plurality of users.

26. The computer communication method of claim 25 wherein the communications network comprises a mobile communications network.

27. The computer communication method of claim 25 wherein the communications network comprises the internet.

28. The computer communication method of claim 25 wherein the communications network comprises a local area network.

29. The computer communication method of claim 25 wherein the at least one first user of the plurality of users accesses the communications network via a mobile device.

30. The computer communication method of claim 25 wherein the second data received from the at least one first user of the plurality of users comprises personal information corresponding to the at least one first user of the plurality of users and the second data received from the at least one second user of the plurality of users comprises personal information corresponding to the at least one second user of the plurality of users.

31. The computer communication method of claim 25 wherein the second data received from the at least one first user of the plurality of users and the second data received from the at least one first user of the plurality of users comprises information corresponding to an object of the comparison.

32. The computer communication method of claim 25 wherein the first data comprises personal information corresponding to the at least one first user of the plurality of users.

33. The computer communication method of claim 25 wherein the first data comprises a correlation to money.

34. The computer communication method of claim 25 wherein the comparison of the second data entered by the at least one first user of the plurality of users to the second data entered by the at least one second user of the plurality of users is performed with a computer by directly comparing an intermediate result.

35. The computer communication method of claim 25 wherein the comparison of the second data entered by the at least one first user of the plurality of users to the second data entered by the at least one second user of the plurality of users is performed with a computer by indirectly comparing an intermediate result.

36. The computer communication method of claim 35 wherein the second data entered by the at least one first user of the plurality of users comprises at least one steering signal entered by the at least one first user of the plurality of users via at least one first input device and the second data entered by the at least one second user of the plurality of users comprises at least one steering signal entered by the at least one second user of the plurality of users via at least one second input device.

37. The computer communication method of claim 36 wherein the at least one first input device comprises a joystick.

38. The computer communication method of claim 36 wherein the at least one second input device comprises a joystick.

39. The computer communication method of claim 25 wherein the at least one first user of the plurality of users and the at least one second user of the plurality of users enter their respective second data simultaneously in order to perform a competition.

40. The computer communication method of claim 25 wherein the first data is stored in a pre-loaded storage card represented by a personal code.

41. The computer communication method of claim 40 wherein the personal code is a telephone number.

42. The computer communication method of claim 25 wherein the first data is stored in an online data bank represented by a personal code.

43. The computer communication method of claim 42 wherein the personal code is a telephone number.

44. The computer communication method of claim 25 wherein the first data is stored in an online credit account represented by a personal code.

45. The computer communication method of claim 44 wherein the personal code is a telephone number.

46. The computer communication method of claim 25 wherein the second data entered by the at least one first user of the plurality of users corresponds to the skill of the at least one first user of the plurality of users and the second data entered by the at least one second user of the plurality of users corresponds to the skill of the at least one second user of the plurality of users.

47. The computer communication method of claim 46 wherein the outcome of the entertainment game is further the product of random parameters communicated to the at least one first user of the plurality of users and the at least one second user of the plurality of users prior to the start of the entertainment game.

48. The computer communication method of claim 47 wherein the random parameters are communicated to the at least one first user of the plurality of users via at least one first instant ticket and the random parameters are communicated to the at least one second user of the plurality of users via at least one second instant ticket.

* * * * *

UNITED STATES PATENT AND TRADEMARK OFFICE
CERTIFICATE OF CORRECTION

| | | |
|---|---|---|
| PATENT NO. | : 7,736,233 B2 | Page 1 of 1 |
| APPLICATION NO. | : 11/404402 | |
| DATED | : June 15, 2010 | |
| INVENTOR(S) | : Pachnis et al. | |

It is certified that error appears in the above-identified patent and that said Letters Patent is hereby corrected as shown below:

Title Page:
Add new section with INID Code (30):
Foreign Application Priority Data
Apr. 14, 2005 (EP) ..................... ... 05386008.6

Col. 7:
Claim 12, line 62: "claim 11" should read --claim 1--.

Col. 8:
Claim 22, line 28: "claim 21" should read --claim 1--.
Claim 25, line 49: Insert --receiving-- before --at a server--.

Signed and Sealed this
Third Day of May, 2011

David J. Kappos
*Director of the United States Patent and Trademark Office*